United States Patent [19]  
Ohashi et al.

[11] 3,979,079  
[45] Sept. 7, 1976

[54] ROLL FILM WINDING MECHANISM
[75] Inventors: Katsuaki Ohashi, Shiki; Hirao Monde, Tokyo, both of Japan
[73] Assignee: Asahi Kogaku Kogyo Kabushiki Kaisha, Japan
[22] Filed: Oct. 28, 1975
[21] Appl. No.: 626,313

[30] Foreign Application Priority Data  
Nov. 5, 1974 Japan............................ 49-127396

[52] U.S. Cl. ............................................ 242/75.2
[51] Int. Cl.² ........................................ B65H 23/10
[58] Field of Search ............... 242/75.2, 71, 67.1 R, 242/71.1, 67.2, 71.2, 71.4, 71.5, 71.7, 67.3 R; 226/195; 354/214

[56] References Cited  
UNITED STATES PATENTS  
2,353,044  7/1944  Kriegsheim ..................... 242/71.2  
2,521,932  9/1950  Mihalyi ............................. 242/71.1  
2,566,267  8/1951  Wallace ............................ 354/214

Primary Examiner—Edward J. McCarthy  
Attorney, Agent, or Firm—McNenny, Pearne, Gordon, Gail, Dickinson & Schiller

[57] ABSTRACT

A roll film winding mechanism is provided for film of the type which is wound on a flanged winding spool with superposed liner paper for protection against light intrusion and accidental exposure. The winding mechanism includes a tension roller disposed between a support member for guiding the film and the spool. The tension roller is arranged to bias the film together with the liner paper to provide a controlled winding tension, and to inwardly curl the longitudinal edges of the film and liner paper toward the spool shaft as they are wound to assure a secure light seal.

10 Claims, 6 Drawing Figures

ROLL FILM WINDING MECHANISM

BACKGROUND OF THE INVENTION AND PRIOR ART

In cameras employing a 35 mm. cinefilm, the film is usually wound successively with advancement of photographing operation, without using any light-blocking or liner paper, around a spool disposed in the camera body which is itself in a light-blocked state. Then, at the time when a predetermined number of film frames have been exposed, the film is rewound into a patrone or magazine from which the light is also blocked. Thus, the film is not taken out of the camera body in the state where it is wound around the spool, but is only taken out after it has been rewound into the patrone or magazine. Accordingly, even if the film is wound around the spool loosely without imparting a proper tension to it, there is no danger of light leakage encountered.

While in cameras employing a roll film, or for example a 60 mm. roll film (usually referred to as 120 or 220 type), wherein the light-blocking or liner paper including the leader portion is superposed on the film and wound together with the film for blocking the light, the film which is wound as the photographing operation proceeds is not rewound but, rather, is taken directly out of the camera in the wound state. Therefore, to eliminate the danger of light leakage and accidental exposure, film of this type has to be wound accurately and in a tightly tensioned state.

If the film is wound loosely or partially engaged in an offset position, with the flanges formed on the opposite ends of the spool, external light will intrude through the gap defined between the liner paper and film. To eliminate this danger, the width of the liner paper including the leader portion is selected so as to have a slightly larger size than the interspace between the opposite flanges on the spool, and the width of the film is selected so as to have a slightly smaller size than said interspace. In this way, when wound around the spool shaft, the liner paper will be engaged at its opposite side edges with the flanges and slightly bent upwardly. Because of the slight difference between the width of the liner paper and the interflange space of the spool, it is essential in winding the film to rotate the spool precisely around the central axis of the spool and, in addition, to make the leader portion of the liner paper engaged with the spool in a controlled direction which is precisely identical with the winding direction.

To wind the film precisely around the spool, in spite of the slight difference between the width of the liner paper and the interflange space of the spool, the film has to be wound while a sufficient tension is being applied against the winding resistance. In a practical operation, it has been required heretofore to apply a sufficiently large force to the film.

The foregoing problems are eliminated by the subject invention. More particularly, the dangers of the roll film of the foregoing type being wound loosely and the film and liner paper being wound together around the spool in an offset position and engaged with one of the opposite spool flanges, which happens when the film is wound in the out-of-perpendicular direction to the axis of rotation of the spool shaft, are eliminated. In this way, the invention makes it possible to eliminate the danger of light leakage when the rear lid of the camera is opened and the wound film is taken out. Further, failure in the photographing operation which might otherwise be encountered, due to improper film winding, is avoided.

In accordance with the present invention, a tension number is arranged between the winding spool shaft on which the winding spool is mounted and a support member or roller adapted to guide the film together with the liner paper to the winding spool. The tension member pushes the film from outside the plane, including the common tangential line connecting the outer circumferences of the support member or roller and spool shaft toward the plane. The tension member may preferably be in the form of a roller having opposite end portions, each of these end portions having an increasingly larger diameter toward the outer end thereof.

DETAILED DESCRIPTION OF THE INVENTION

Figure 1:
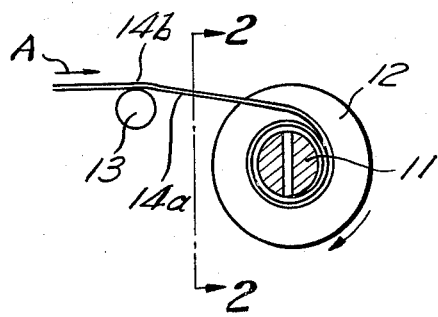
FIG. 1 is a plan view of a prior art roll film winding mechanism.
Figure 2:
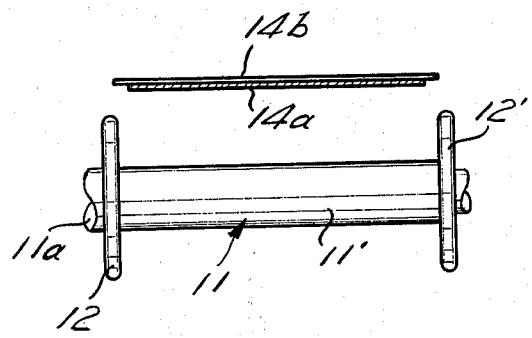
FIG. 2 is a vertical, sectional view taken along line 2—2 of FIG. 1.

Now the mechanism of this invention will be described in greater detail with reference to the embodiment shown in the accompanying drawings. Illustrated in FIGS. 1 and 2 is a film winding mechanism which has commonly been employed heretofore. A winding spool 11, including a spool shaft 11', having flanges 12 and 12' formed on the opposite axial ends thereof, is mounted on a winding shaft 11a carried by the camera body (not shown). A support member or roller 13 is arranged at a position between the film exposing plane and the winding shaft so as to guide the traveling film. Thus, during winding, film 14a is superposed on liner paper 14b and forced to advance from the exposing plane in the direction of arrow A over the roller 13 and wound around the winding spool 11 at the position defined between flanges 12 and 12'.

Figure 3:
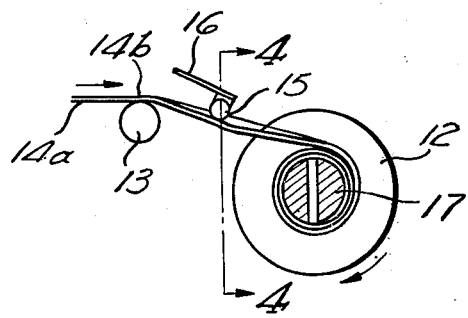
FIG. 3 is a plan view of the roll film winding mechanism, including a tension member, in accordance with the present invention.
Figure 4:
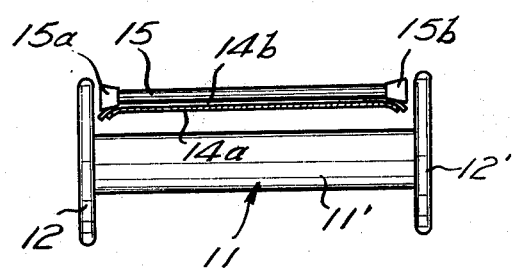
FIG. 4 is a vertical, sectional view taken along line 4—4 of FIG. 3.
Figure 5:
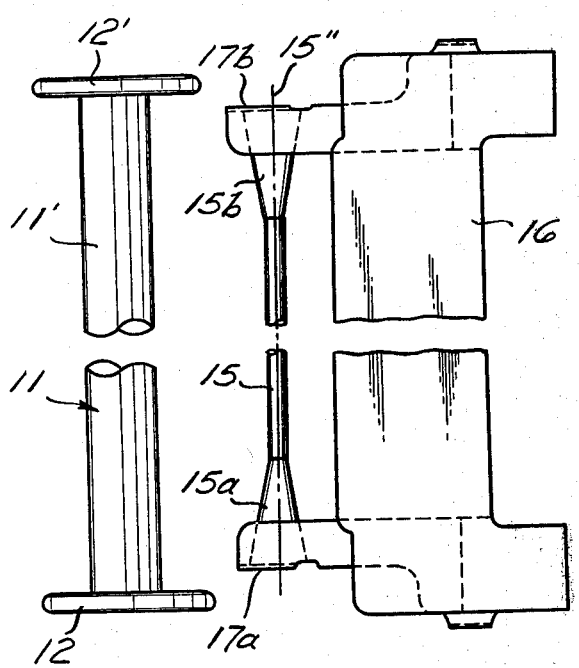
FIG. 5 is a fragmentary, rear elevation on an enlarged scale of the roll film winding mechanism according to the present invention.
Figure 6:
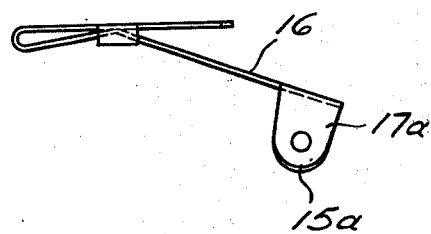
FIG. 6 is a plan view of the tension member as shown in FIG. 5.

Referring to FIGS. 3 to 6, a roll film winding mechanism in accordance with the present invention is shown. As the film 14a is traveling, it is pushed or biased on the side of liner paper 14b by a tension member or roller 15, which has opposite end portions provided with increasing diameters. The roller 15 is carried on a resilient plate 16 located on the outside or opposite side of the tangential line connecting the outer circumferences of the spool shaft 11' and roller 13 (FIG. 3). The resilient plate 16 adapted to carry the roller 15 is preferably attached to the rear lid of the camera (not shown) so that it does not prevent the film loading operation and the operation for engaging the leader portion of the nonexposed film into the slit formed in the spool shaft 11'. However, it is not always necessary to attach the resilient plate 16 to the rear lid. For example, the plate 16 may be mounted on the wall of the camera body at positions where the rear lid is engaged with the camera body.

The roller 15 includes a roller axis 15" and tapered roller portions 15a and 15b integrally formed adjacent the opposite ends of the roller axis 15". Each of the tapered roller portions 15a and 15b has an increasingly larger diameter toward the outer end thereof and a trapezoidal axial cross section.

The roller 15 is rotatably supported at its opposite ends with ears 17a and 17b which are formed by bending the side edges of said resilient plate 16. The ears may be made of a metal or, preferably, a synthetic resin. Alternatively, the tension member may in the form of a leaf spring which is appropriately shaped so as to avoid damaging either the liner paper or film.

With the above-described film winding mechanism of this invention, upon rotation of the winding shaft, the spool shaft winds around it the film, together with the liner paper. At this time, a tensile force acts on the liner paper and film and, at the same time, a pressing force is applied to the traveling film from the rear side of the liner paper 14b. As a result, the liner paper 14b is curled inwardly together with the film 14a so that the opposite edges of the liner paper 14b are surely introduced between the flanges 12 and 12'. Then the opposite edges of the liner paper 14b are first brought into engagement with the positions where the spool shaft 11' is connected with the opposite flanges 12 and 12' so that the film 14a can be wound together with the liner paper around the winding spool 11 while being held by the inwardly curled liner paper 14b and reliably kept in contact with the spool shaft 11'. Accordingly, the winding force can act on the film lightly and smoothly to wind the film around the winding spool 11 in an accurately superposed position, eliminating the danger of abnormal winding. This avoids failures in the photographing operation which might otherwise be encountered due to improper film winding.

What is claimed is:

1. A roll film winding mechanism for film and superposed liner paper characterized in that a tension member is arranged between a winding shaft adapted to mount a winding spool having a shaft and flanges adjacent its axial ends and a roller adapted to guide the traveling film and liner paper, said winding spool shaft and roller defining a plane including the common tangential line connecting the outer circumferences thereof on the film-contacting side of the roller, said tension member being arranged to bias the film and liner paper in a direction from the remote side of said plane toward the side of said plane on which said winding spool and roller are located, said tension member including means for curling both the liner paper and the film inwardly so that, during film winding, the opposite edges of said liner paper are brought into contact with the base portions of said flanges adjacent to where said flanges are connected to said winding spool shaft.

2. A roll film winding mechanism as set forth in claim 1, wherein said tension member comprises a resiliently horizontal tension roller adapted to extend across the width of the liner paper and film.

3. A roll film winding mechanism as set forth in claim 2, wherein said tension roller is supported adjacent its axial ends by a resilient plate member.

4. A roll film winding mechanism as set forth in claim 2, wherein said means for curling the liner paper and film comprise enlarged diameter portions adjacent the axial ends of said tension roller.

5. A roll film winding mechanism as set forth in claim 4, wherein each of said enlarged diameter portions is tapered and has increasingly larger diameters in a direction extending toward the axial end of said tension roller.

6. A roll film winding mechanism including a support member adapted to guide film together with superposed liner paper to a winding spool having flanges adjacent its axial ends, said support member and winding spool defining a common tangential plane on the film-contacting side of said support member, a tension member located intermediate said support member and winding spool and arranged to bias the film and liner paper in a direction from the side of said plane opposite said support member and winding spool toward the side of said plane on which the support member and winding spool are located, said tension member including means for curling the longitudinal edges of the film and superposed liner paper inwardly toward said winding spool adjacent said flanges thereof.

7. A roll film winding mechanism as set forth in claim 6, wherein said tension member resiliently biases the film and linear paper in said direction.

8. A roll film winding mechanism as set forth in claim 6, wherein said means for curling the longitudinal edges of the film and superposed liner paper comprise enlarged portions adjacent the axial ends of said tension member.

9. A roll film winding mechanism as set forth in claim 6, wherein said tension member comprises a roller resiliently, rotatably supported adjacent its axial ends.

10. A roll film winding mechanism as set forth in claim 6, wherein said tension member is mounted on the side of said plane opposite said support member and winding spool.

* * * * *